July 20, 1943.　　　T. J. HEALY　　　2,324,700
BEARING
Original Filed Sept. 29, 1941　　2 Sheets-Sheet 1
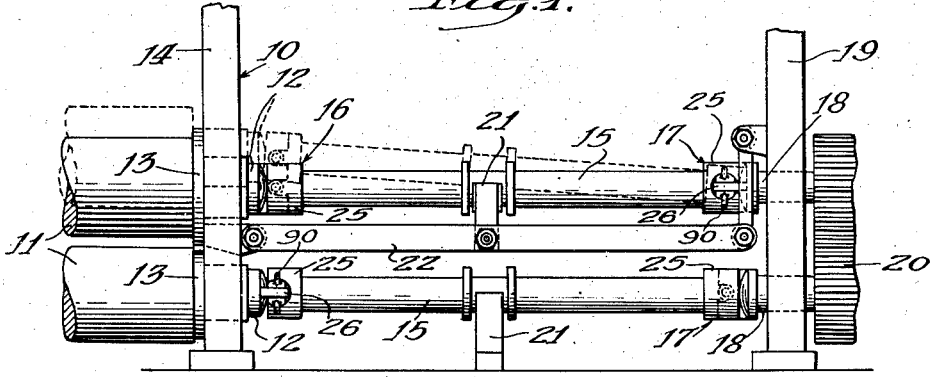
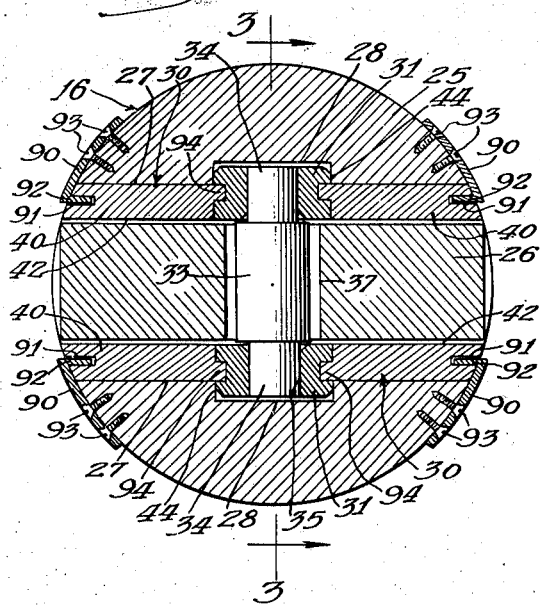
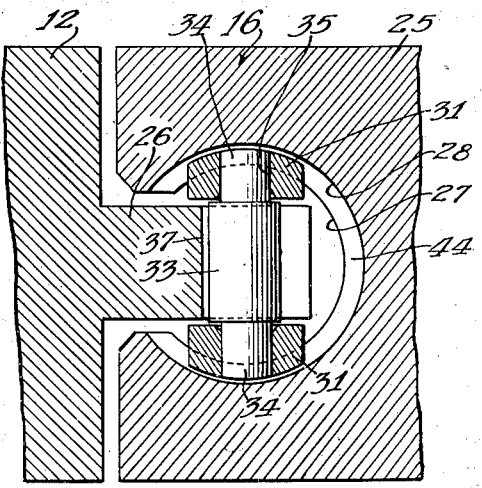
Inventor:
Thomas J. Healy
By Wallace & Cannon
Attorneys

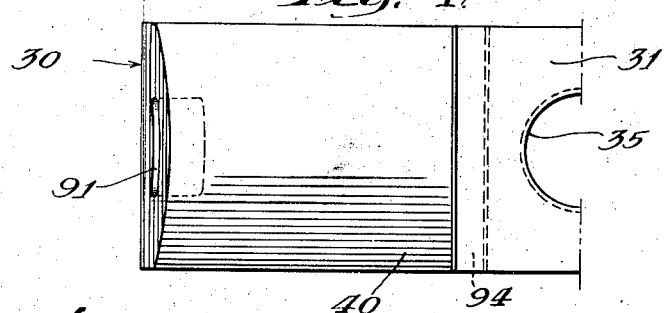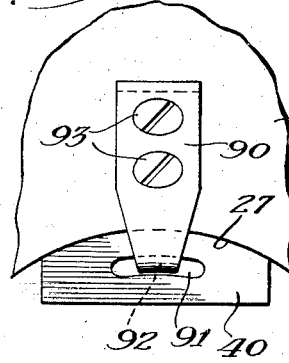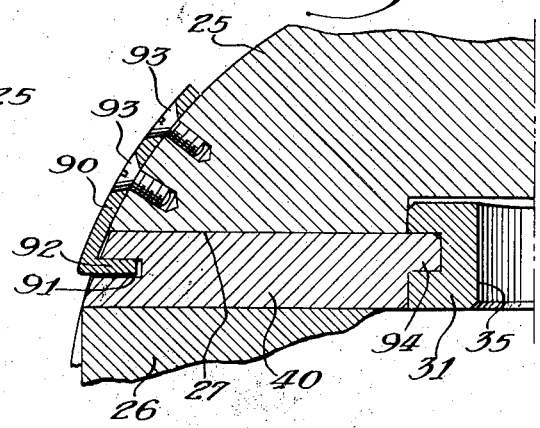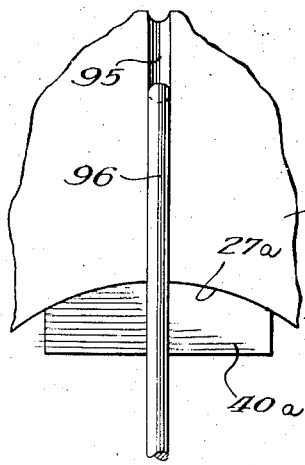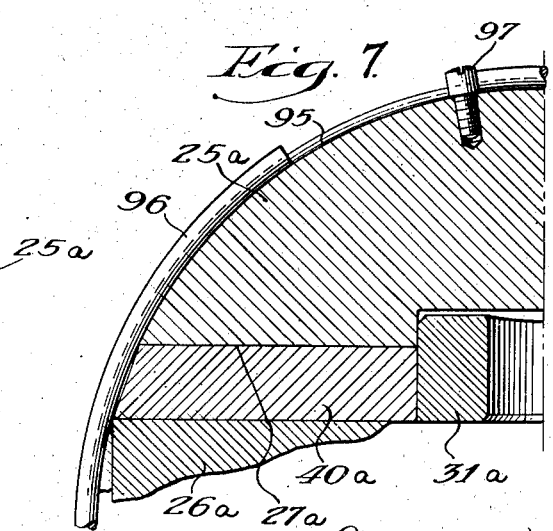

Patented July 20, 1943

2,324,700

UNITED STATES PATENT OFFICE 2,324,700

BEARING

Thomas J. Healy, Baltimore, Md., assignor to American Brake Shoe Company, Wilmington, Del., a corporation of Delaware Original application September 29, 1941, Serial No. 412,750. Divided and this application July 22, 1942, Serial No. 451,933

6 Claims. (Cl. 64—7)

This application is a division of my copending application, Serial No. 412,750, filed September 29, 1941, now patent No. 2,305,696 of Dec. 22, 1942.

This invention relates to bearings and primarily to slipper bearings for universal joint connections and the like.

In instances where torque is to be transmitted from a driving shaft to a driven shaft where such shafts are arranged in end to end relation in such a way that they may move into angular relationship with each other, it is customary to interconnect the shafts by a universal joint or the like. One form of universal joint which has been used in such instance comprises a female member formed on or secured to an end of one of the shafts, and a male member is similarly provided on the adjacent end of the other shaft. In such a joint the male member is inserted into the female member and an interconnection therebetween is afforded by what are known as slipper bearings and also a pivotal interconnection and the arrangement is such that relative pivotal movement about axes at right angles to each other is afforded whereby a driving interconnection is maintained between the driving and driven parts of the joint when these parts move out of axial alignment one with the other.

Usually a flat fishtail or tongue is provided on the male member of a joint of the aforesaid character and a bifurcation is provided in the female member into which the aforesaid tongue is passed. Arcuate recesses are formed in opposed faces of the bifurcation in the female member and these recesses extend transversely across the bifurcation in the female member. Slipper bearings in the form of segments of a cylinder are disposed in the aforesaid recesses and the flat faces of such segments are disposed on opposite faces of the aforesaid tongue when it is extended into the bifurcation. A bearing or spacing pin centrally located with respect to the longitudinal extent of the slipper bearings and extended therebetween is received in a bifurcation or other suitable opening in the tongue and it is this that affords one of the axes about which parts may move upon disalignment of the driving and driven portions, the slipper bearings rotating in the aforesaid arcuate recesses to afford the other of the axes about which the relative pivotal movement may occur.

In what may well be referred to as the conventional type of slipper bearings heretofore employed in universal couplings of the aforesaid character, each bearing comprises a medial boss portion having an opening or socket for receiving an end of the aforesaid bearing pin, and two end sections which are integral with and extend in opposite directions from the boss. When such slipper bearings are employed where the male and female members of the coupling are operated continuously in the same direction of rotation over long periods of time, as in the case of continuous type steel rolling mills, for example, there is a tendency for one end section of each bearing to become badly worn or otherwise damaged while the boss and the other end section of the bearing are still in relatively good condition. Because of the one-piece construction of these conventional slipper bearings, it has been necessary, whenever such an end section of a bearing became badly worn or otherwise damaged so as to require replacement, to completely disassemble the universal coupling and to then replace the partially defective slipper bearing with an entire new bearing. Particularly where the shafting which is interconnected by the universal coupling is relatively heavy and cumbersome, such disassembly is quite difficult and entails considerable loss of time and consequent production delays. However, such disassembly of the coupling and replacement of an entire bearing may be avoided by so constructing the bearing that the end sections thereof may be readily removed from the coupling independently of the boss thereof, whereby a worn or defective end section may be replaced by a new end section and to so constitute and arrange a slipper bearing is the primary object of my invention, and an object ancillary to this is to preserve the conventional design of the slipper bearings so that they may be used in existing universal couplings, but at the same time to render the end sections of each slipper bearing independently separable from the boss thereof.

A still further object is to so arrange the slipper bearings that the end sections thereof will be readily interchangeable.

Still another object is to maintain the end sections in proper relation to the boss of the slipper bearing by providing means mounted on the female member of the coupling for externally retaining the parts of the slipper bearing against separation when the bearing is in service. A further object in this regard is to so arrange the retaining means that the end sections of a bearing may be readily removed from the coupling and replaced when desired without disassembling the coupling.

Yet other objects are to provide a slipper bearing of simple and economical construction and which will be efficient and practical in use.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a fragmental elevational view of a rolling mill and the driving means therefor;

Fig. 2 is a transverse sectional view of a universal coupling and showing the manner in which the slipper bearings are arranged therein;

Fig. 3 is a longitudinal sectional view taken on the line 3—3 on Fig. 2;

Fig. 4 is a fragmentary plan view of one of the slipper bearings shown in Figs. 1 to 3;

Fig. 5 is an enlarged fragmentary view illustrating a portion of the structure shown in Fig. 2;

Fig. 6 is a fragmentary elevational view of the coupling and one end of the slipper bearing shown in Figs. 4 and 5;

Fig. 7 is a transverse sectional view similar to Fig. 5 but illustrating a different type of slipper bearing and retaining means therefor; and Fig. 8 is an end elevational view looking from the left in Fig. 7.

A rolling mill of the character in which the slipper bearing of the present invention may be utilized, is fragmentally shown in Fig. 1. As therein illustrated the rolling mill 10 includes a pair of opposed rolls 11, the end portions or pintles 12 of which are journaled in bearings as 13 that are carried by the frame members as 14. These end portions 12 of the rolls 11 project beyond this frame member 14 and are connected by means of universal joints or couplings 16 to spindles 15, which are in turn connected by universal couplings 17 to stub shafts 18 that are carried by a frame member 19. A suitable driving means (not shown) is connected to the stub shafts 18 by means of gearing 20 for the purpose of rotatively driving the spindles 15 and connected rolls 11. Thrust or spindle carrier bearings 21 disposed between the frame members 14 and 19 support the spindles 15 at the middle portions thereof.

The bearings 13 which carry the upper rolls 11 are vertically adjustable in the frame members as 14 in order that the rolls 11 may be vertically spaced to accommodate varying thicknesses of material. The spindle carrier bearing 21 for the upper spindle 15 is supported by a linkage 22 which is so connected to the upper bearing 13 that this bearing 21 may continue to support the upper spindle 15 when it has been moved to a position such as that indicated by the broken line in Fig. 1. Driving connections between this spindle 15 and its associated roll 11 and stub shaft 18 are maintained by the respective universal couplings 16 and 17 even though these members are not in longitudinal alignment with each other.

Each universal coupling 16 or 17 includes a female member 25, which is formed on or secured to an end of a spindle as 15, and a male member 26 which is provided on the adjacent end of an associated stub shaft as 18 or a pintle as 12. As commonly constructed, the female member 25 is bifurcated as shown in Figs. 2 and 3 to receive the male member, which is in the form of a flat tongue 26. The branches of the bifurcation in the female member 25 are arcuately recessed as indicated at 27. Deeper recesses 28 are afforded in the female member 25 midway between the ends of the cylindrical recesses 27 in order to define shoulders as 44, for a purpose that will be explained hereinafter.

The slipper bearings generally designated 30 which are employed in such universal couplings include end sections 40 which are constructed approximately in the form of segments of a cylinder, and one of these end sections is disposed in each cylindrical recess 27 in each female member 25, on opposite sides of the deep recess 28. A medial portion or boss 31 is included in each slipper bearing 30 and this boss is of greater thickness than the end sections 40 of such bearing. Each such boss 31 is disposed in the deep recess 28 in the female member 25 so as not to ride the face of the deep recess while the end sections 40 are disposed in contact with the arcuate bearing surfaces within the cylindrical recesses 27, the convex surfaces of the end sections 40 therefore conforming with the arcuate bearing surfaces 27 when the slipper bearings are assembled in the coupling. A bearing or spacing pin 33 is interposed between the slipper bearings 30 to maintain these bearings in spaced relation, this pin 33 having reduced end portions 34 which are fitted in holes 35, Figs. 2 and 3, extending through the bosses 31. The shoulders on the pin 33 afforded by the reduced ends thereof serve to space the slipper bearings 30 in the coupling. The tongue 26 of the coupling is provided with a bifurcation or slot 37, Figs. 2 and 3, in which the pin 33 is disposed when the tongue 26 is inserted into the female member 25, clearance being afforded between the pin 33 and the tongue 26 to facilitate assembling the coupling and to enable the necessary freedom of movement of the parts relative to each other when the coupling is in service. The flat faces of the slipper bearings 30 are disposed toward the adjacent faces of the tongue with a slipper bearing, therefore, disposed on each side of the tongue.

When the shafts which are interconnected by a universal coupling as 16 or 17, Fig. 1, are not longitudinally aligned, as is the case when the upper spindle 15 and roll 11 are in their broken-line positions, Fig. 1, the tongue 26 constantly changes its angular position relative to the female member 25 of such coupling as the shafts are rotated and this causes the slipper bearings 30 to rock back and forth rotatively within the cylindrical recesses 27 in the female member 25, Fig. 13. However, the slipper bearings 30 are restrained against longitudinal movement by the end faces 43 of the bosses 31 which abut the shoulders as 44 intermediate the recesses 27 and 28.

When the universal coupling is in service in a continuous type of steel rolling mill, for example, the tongue 26 tends to bear against only one of the end sections 40 of the slipper bearing 30, the other end section of such bearing being relatively free from such stress. As the more heavily stressed end sections 40 of the slipper bearings 30 rub against their cooperating bearing surfaces 27 in the female member 25, the material of which these bearing end sections are composed gradually wears away, the greatest amount of wear taking place at the outward extremities of the more heavily stressed end sections 40. On the other hand, those bearing end sections 40 which are not required to withstand the force applied by the tongue 26 undergo a negligible amount of wear. Likewise the rate of wear of the boss portions 31 is relatively slight. Therefore, the boss 31 and the end section 40, which is not under stress, are usually still in relatively good condition when the more heavily stressed end section 40 of a slipper bearing has become so worn as to be unfitted for further service. In such a case it is disadvantageous to discard an entire slipper bearing merely because one end section thereof has become badly worn or otherwise damaged.

Hence, I propose to make the end sections 40 and the boss 31 of each slipper bearing 30 as separate pieces that may be secured together in end to end relation as shown in Figs. 1, 2, 4, 5 and 6, the boss 31 being medially located with respect to the end sections 40. In accordance with this invention such a securing action is afforded by means mounted on the coupling and acting on the end sections 40 to hold them removably in place in the coupling. Thus in the embodiment of the invention illustrated in Figs. 1 to 6, the end sections as 40 of each slipper bearing 30 are not directly attached to the boss 31 but each end section is externally retained against separation from the boss by a retaining device such as the strap 90 which is attached by screws 93 to the exterior surface of the female member 25 and extends past the open end of the recess 27 in which the adjacent end section 40 of the slipper bearing is disposed. Each end section 40 has an arcuate slot 91 in the outer end thereof to receive a hooked end portion 92 of the associated strap 90. The slot 91 is of such length, as compared with the width of the hooked end 92, as to afford ample clearance for enabling the end section 40 to rock back and forth in the recess 27 when the universal coupling is driven rotatively.

As will be noted from Fig. 5, the tongue 26 of the coupling tends to support the end sections as 40 and hence it is not essential to secure the end sections 40 to the boss 31 so long as the external retaining members such as the strap 90 are provided. However, in order to afford additional support for the end sections 40 without securing them to the boss 31, it may be desirable to provide each end section 40 with a tenon 94 which is adapted to fit into a complementary mortise in the boss 31. In such an arrangement the end sections 40 are effectively restrained against displacement relative to the bosses 31 without being secured thereto. The bosses 31 of the paired slipper bearings are, of course, maintained in spaced relation by the bearing pin 33 in the manner described hereinabove.

Still another way in which the parts of each slipper bearing may be retained against separation is illustrated in Figs. 8 and 9. In these views the mortise and tenon joints between the end sections as 40a and boss 31a have been omitted and the end sections as 40 are shown as being disposed adjacent the boss 31a but entirely disconnected therefrom. A peripheral groove 95 is formed in the female member 25a in alignment with the open ends of recesses as 27a therein, and a ring 96 is disposed in this groove 95. The ring 96 is not continuous but is interrupted for a distance sufficient to enable an end section as 40a to be inserted in or withdrawn from the space between the tongue 26a and the female member 25 when the gap in the ring 96 is disposed opposite such end section. Normally the ring 96 is prevented from assuming a position to enable separation of the end sections as 40a from their boss 31a, by means of a screw 97 which is threaded into a tapped opening in the female member 25a at the bottom of the groove 95. The ring 96 is thus effective to retain the end sections 40a against longitudinal displacement with respect to their bosses 31a, except when an end section is to be replaced, in which event the screw 97 is removed and the ring 96 is shifted into the position just described to enable withdrawal of the end section.

With respect to the slipper bearings of this invention wherein the component parts of each bearing are externally retained against separation, it will be understood that, in assembling a coupling including slipper bearings of this character, the boss portions are first arranged in their operative positions spaced by the usual bearing or separating pin. Thereafter the tongue or fishtail of the male member is inserted into the bifurcation in the female member with the bifurcation in the tongue embracing the bearing pin. This affords support for the end sections of the slipper bearings which are thereafter passed into the recesses therefor into association with their cooperating bosses, and then the retaining means for preventing displacement of the end sections are arranged in retaining position.

From the foregoing it will be apparent that I have provided a slipper bearing structure embodying many novel and advantageous features, foremost among which is the three-piece construction of each slipper bearing which enables the end sections thereof to be removed from the universal coupling without disassembling the coupling. While thus rendering the end sections of each slipper bearing separable from the medial boss portion thereof, I have nevertheless preserved the conventional form of the slipper bearings so that they may be utilized in standard universal couplings without necessitating any reshaping of the male and female members of the coupling. The separate end sections of each slipper bearing may be maintained against longitudinal displacement relative to the boss in a number of ways, for example, with the two different arrangements herein shown, and the retaining means through their mounting and support on the exterior surfaces of the coupling member, are readily released when the operator wishes to replace a worn end section. Such replacement may be made without uncoupling of the members, and hence valuable machine time is conserved.

Thus, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at the medial parts thereof; the combination of a pair of slipper bearings respectively disposed in the arcuate recesses and including convex faces to conform therewith and also having flat faces respectively disposed toward opposed flat faces of said tongue, each of said slipper bearings comprising a medial boss portion and two separate end sections disposed at opposite sides of said boss and extending therefrom, said bosses being of greater thickness than said end sections and being disposed in the deepened parts of the arcuate recesses in said female member, a bearing pin having a body portion extended through the opening in said tongue and including reduced portions at opposite ends of said body and which pin is formed with shoulders at the juncture of said body and end portions, said bosses having openings therein in which the end portions of said pin are respectively fitted to thereby enable said shoulders to maintain the bosses in spaced relation, and releasable means on the female member of the coupling and operable to prevent displacement of the end sections from the boss of the bearing of which said end sections are a part, said means being releasable to enable withdrawal of any of said end sections from the recess in which it is mounted without removing the associated boss from the female member of the coupling.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, each of said slipper bearings comprising a medial part and two separate end sections disposed at opposite sides of said medial part and extending therefrom, a bearing pin extended through the opening in said tongue and into the medial parts of said bearings, and means exteriorly disposed on said female member and extending over the ends of the recesses therein to retain the end sections of each slipper bearing against longitudinal displacement from said recesses.

3. A device as set forth in claim 2, in which said retaining means embodies manually releasable fastening means holding said retaining means in position over the ends of said recesses, said retaining means upon release of said fastening means being shiftable to ineffective positions for thereby enabling any of said end sections to be withdrawn from said female member without otherwise disturbing the universal coupling.

4. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having at least one slot extended thereinto from one end edge thereof with said slot arcuately formed substantially concentric with said arcuate face, said slot being adapted to receive means for securing said element in substantially predetermined relation with respect to other of the sections of the bearing.

5. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having a slot extended thereinto from one end edge thereof and disposed substantially concentrically with respect to said arcuate face, said body having a portion extended beyond the other end edge thereof and affording a tenon for reception in a mortise in another section of the bearing, said slot being adapted to receive means for securing said element in an operative relation with respect to other of the sections of the bearing.

6. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having a portion extended beyond one end edge thereof and affording a tenon adapted for reception in a mortise in another of the sections of said bearing.

THOMAS J. HEALY.